United States Patent
Kliewer et al.

(10) Patent No.: US 7,068,216 B2
(45) Date of Patent: Jun. 27, 2006

(54) METHOD FOR THE LINEARIZATION OF FMCW RADAR DEVICES

(75) Inventors: Jörg Kliewer, Kiel (DE); Georg Weiss, Kipfenberg (DE)

(73) Assignee: EADS Deutschland GmbH, Ottobrunn (DE)

( * ) Notice: Subject to any disclaimer, the term of this patent is extended or adjusted under 35 U.S.C. 154(b) by 100 days.

(21) Appl. No.: 10/816,662

(22) Filed: Apr. 2, 2004

(65) Prior Publication Data

US 2005/0001761 A1    Jan. 6, 2005

(30) Foreign Application Priority Data

Apr. 2, 2003    (DE)    ................. 103 15 012

(51) Int. Cl.
*G01S 7/40*    (2006.01)
(52) U.S. Cl. ................. 342/174; 342/102; 342/192
(58) Field of Classification Search ................. 342/128, 342/102, 89, 165, 174, 192
See application file for complete search history.

(56) References Cited

U.S. PATENT DOCUMENTS

| | | | | |
|---|---|---|---|---|
| 4,539,565 A | | 9/1985 | Norsworthy et al. | |
| 5,172,123 A | * | 12/1992 | Johnson | 342/200 |
| 5,187,484 A | * | 2/1993 | Stove | 342/200 |
| 5,252,981 A | * | 10/1993 | Grein et al. | 342/200 |
| 5,719,580 A | | 2/1998 | Core et al. | |
| 6,703,969 B1 | * | 3/2004 | Winter et al. | 342/174 |

FOREIGN PATENT DOCUMENTS

| | | |
|---|---|---|
| DE | 41 04 792 | 8/1992 |
| DE | 41 04 792 A1 | 8/1992 |
| EP | 0 501 566 | 9/1992 |
| EP | 0 573 321 | 12/1993 |
| WO | WO 98/38523 | 9/1998 |

OTHER PUBLICATIONS

Kulpa K S et al.: The Simple Method for Analysis of Nonlinear Frequency Distortions in FMCW Radar, Microwaves, Radar and Wireless Communications. 2000, 13th Int'l Conference May 22-24, 2000—235-238.

* cited by examiner

*Primary Examiner*—Thomas H. Tarcza
*Assistant Examiner*—Matthew M. Barker
(74) *Attorney, Agent, or Firm*—Collard & Roe, P.C.

(57) ABSTRACT

A method for the linearization of frequency modulated continuous wave (FMCW) radar devices having non-linear, ramp-shaped, modulated transmitter frequency progression x(t). With this invention, a correction phase term for compensation of the phase error in the reception signal q(t) is calculated on the receiver side in this device.

12 Claims, 4 Drawing Sheets

METHOD FOR THE LINEARIZATION OF FMCW RADAR DEVICES

CROSS REFERENCE TO RELATED APPLICATIONS

This application is based upon German Application Serial No. 10315012.9 Filed on Apr. 2, 2003 wherein priority is claimed under 35 U.S.C. 119.

BACKGROUND OF THE INVENTION

The invention relates to a method for the linearization of a frequency modulated continuous wave (FMCW) radar device.

With FMCW radar devices, phase errors occur in the reception signal, as the result of a not strictly linear characteristic in a transmission frequency of an FMCW radar device. This results in a loss of accuracy in the evaluation of the signal.

In this case, various methods are known for linearizing an FMCW radar device. For example, one known method discloses a method wherein a delayed transmission signal is generated via an optical delay line having a defined running time. In this case, the delayed transmission signal is mixed with the non-delayed transmission signal. Thus, it is possible to determine the deviation from the ideal linear characteristics. In particular, the disadvantages of this method are the great amount of construction effort, expense and the age-related clouding of the optical components.

In addition, it is also known to generate a signal function that can be predetermined, such as a linear characteristic via a digital direct synthesis (DDS) system. However, a disadvantage of this system is that there is a large construction effort and expense associated with this cost intensive structure.

An FMCW radar system having linear frequency modulation is known from German Patent DE 4104792 A1. In this system, there is an oscillator that generates a ramp-shaped modulated signal having a modulated oscillation frequency, which is emitted by an antenna. A monitoring and control unit determines the deviation of the measured modulated oscillator frequency of a signal reflected from an object via a Hilbert transformation using a linearized reference value. In this case, a phase deviation can be determined from the deviation that has been determined.

From this deviation, a correction signal is generated, which is passed to the oscillator, whereby the oscillation frequency is modified in accordance with the predetermined reference values. A disadvantage of this system is that this involves a great construction effort, which is cost intensive, since additional components are required.

SUMMARY OF THE INVENTION

The invention relates to a method with which an FMCW radar device can be linearized, without a great construction effort or expense.

In this case, a correction phase term is calculated on the receiver side for compensation of the phase error in the reception signal q(t). In contrast with known methods, no costly components are required in the transmission branch of the FMCW radar device when using this method and this thus results in reducing costs.

This method, which relates to the invention should include the following steps:

selecting a number L of consecutive ramp-shaped reception sequences $q_k(n)$ of the reception signal, which number can be predetermined, with K=1, ..., L, the phases $\arg\{q_k(n)\}$ of which can be represented as a polynomial of the $N^{th}$ order for the time index n, with the polynomial coefficient $m_l$, with l=1, ..., N, transforming a spectrum range $Q(e^{j\Omega})$ of the selected reception sequences q(n) into a basic band reception sequence $\hat{q}_k(n)$ with k=0, ... L−1, iteratively calculating a correction phase term for partial compensation of non-linear frequency components in the basic band reception sequences $\hat{q}_k(n)$ by means of calculating polynomial coefficients $\hat{m}_{l,k}^{(i)}$ of the individual basic band reception sequences $\hat{q}_k(n)$ via estimating methods wherein $\hat{q}_k(n)$ are the sequences that have already been iteratively phase-corrected, and whereby the iteration is stopped once the parameter change between two consecutive iterations, which can be predetermined, remains below a threshold $\epsilon$, which can be predetermined.

In another embodiment of the invention, the scanning cycle $T_A$ of the ramp signals is reduced, in a method step after the base band transformation. For this purpose, a prior antialiasing low pass filtering of the ramp signals $q_k(n)$ is performed. In addition, it is beneficial if the downsampling factor K, by which the scanning cycle $T_A$ is reduced, lies between K=30 and K=60.

In contrast, with an alternative linearization of the frequency modulation of the radar transmission signal, the linearization is performed on the receiver side, via a digital processing of the reception signal. Thus, no additional components are required for this method. The calculations required for this method can be performed by the components for signal evaluation that are already present. This results in additional advantages with regard to the production costs.

Another advantage of the invention is that there can be in an inexpensive estimation method that can be easily implemented, since the reception signal is processed in the base band. This signal results in a reduction of the scanning cycle $T_A$ by a factor K between 30 and 60. In addition another advantage of this method is that there can be a calculation of the polynomial coefficients via a robust estimation method. This is even in the case of channels subject to severe interference. Thus, there can be a relatively good compensation of phase errors with signal to noise ratios (SNR) of up to −20 dB using this method. Thus, the method can be used for not only the civil sector, but also in the military sector or for distance measurements.

BRIEF DESCRIPTION OF THE DRAWINGS

Other objects and features of the present invention will become apparent from the following detailed description considered in connection with the accompanying drawings, which discloses at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
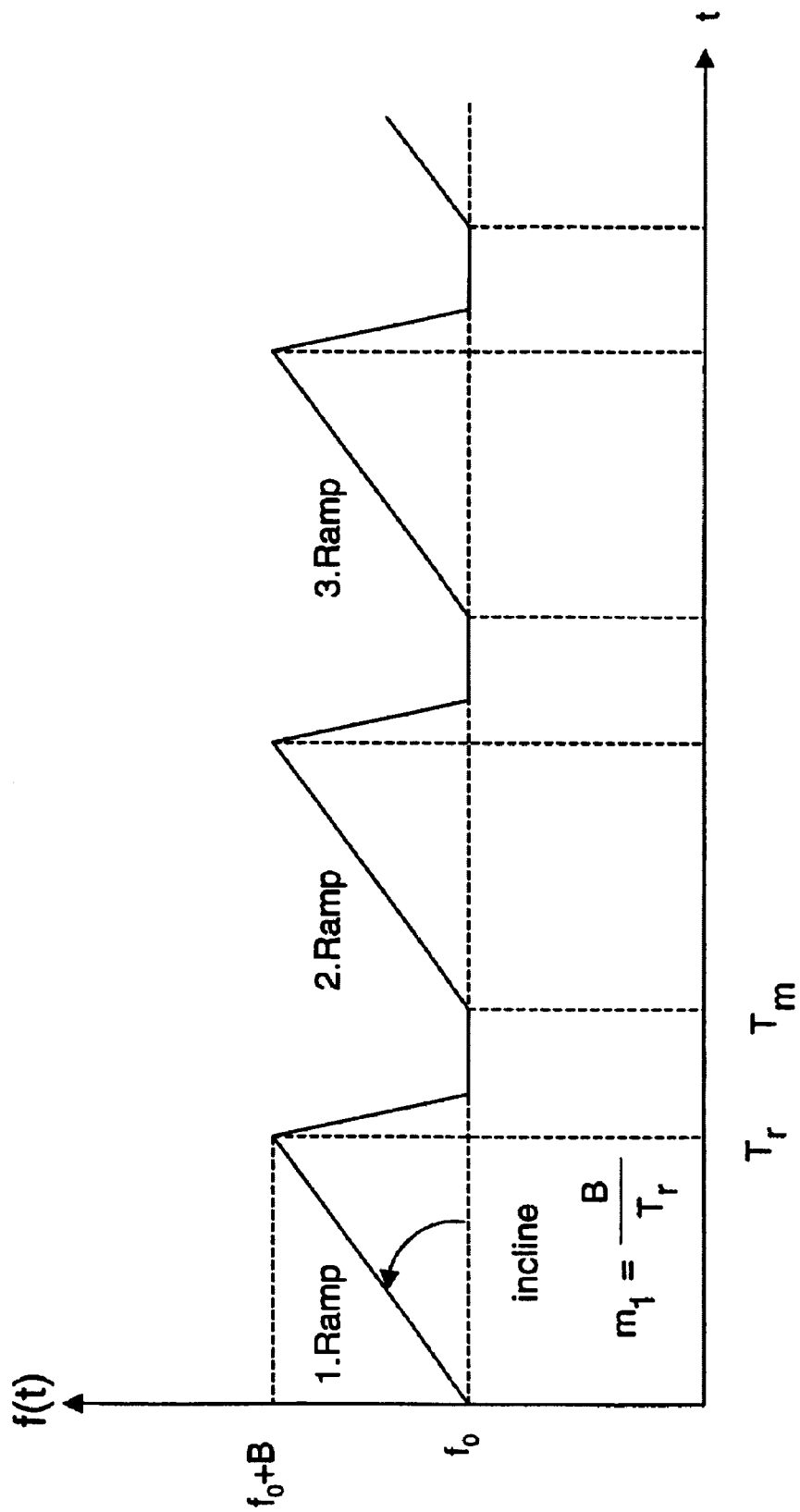
FIG. 1 is an exemplary idealized ramp-shaped FMCW transmission signal.

Turning now in detail to the drawings, FIG. 1 shows the starting point of this method is the transmission signal of an FMCW radar that is in the general polynomial approach of the $N^{th}$ order for a transmission ramp as:

$$x(t) = \exp\left\{j2\pi\left(f_0 t + \frac{m_1}{2}t^2 + \frac{m_2}{3}t^3 + \frac{m_2}{4}t^4 + \ldots + \gamma_0\right)\right\} \quad (1)$$

With $t \in [0, T_r]$. With this design, the coefficients $m_l$ with $l=2, \ldots, N$ represent the polynomial parameters, $\gamma_0$ represents the initial phase, and $T_r$ represents the time duration of the transmission ramp. The parameter $m_1$ or slope that is assumed to be given, indicates the linear component $m_1 = B/t$, which is exclusively present in an ideal case, wherein B describes the frequency deviation of the FMCW radar system. Thus in the following formula, a single reflecting point shaped object is assumed. Thus, the corresponding parameters are represented in FIG. 1, using the example of an idealized transmission signal. Thus with Equation (1) the reception signal in an ideal, noise free case is then:

$$y(t) = \exp\left\{j2\pi\left(f_0 t + \frac{m_1}{2}t^2 + \frac{m_2}{3}t^3 + \frac{m_2}{4}t^4 + \ldots + \gamma_0 - \frac{s(t)}{\lambda(t)}\right)\right\} \quad (2)$$

Figure 2:
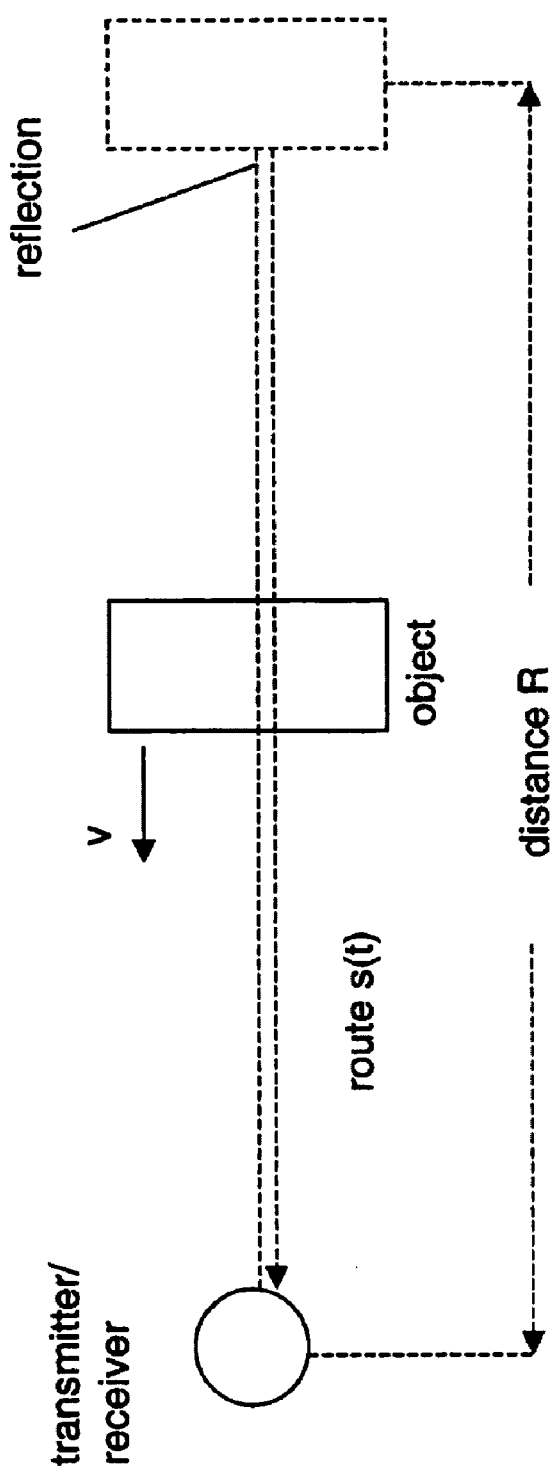
FIG. 2 is an exemplary representation of the refection of the radar signal on a point shaped object at distance R.

Since the determination of relative distances between objects that are moving relative to the radar sensor at approximately the same speed represents a possible use of the method described, it can be assumed that $s(t) = 2R$ in the following (FIG. 2).

For the momentary wavelength $\lambda(t)$, the following results at the speed of light c:

$$\frac{1}{\lambda(t)} = \frac{f(t)}{c} = \frac{1}{c}\left(f_0 + \sum_{l=1}^{N} m_l t^l\right) \text{ with } f(t) = \frac{1}{2\pi}\frac{d\arg\{x(t)\}}{dt} = f_0 + \sum_{l=1}^{N} m_l t^l$$

It is advantageous if the reception signal y(t) is mixed into a lower frequency position. The mixed reception signal $q_e(t)$ results as follows, from Equations (1) and (2):

$$q_e(t) = y(t) \cdot x^*(t) = \exp\left\{-j\frac{4\pi R}{c}\left(f_0 + \sum_{l=1}^{N} m_l t^l\right)\right\} \quad (3)$$

If $q_e(t)$ describes a harmonic exponential function, i.e. if $m_l=0$ with $l=2, \ldots, N$, then the ideal case is present, and the transmission signal x(t) possesses a purely linear increase in the transmission frequency.

In order to indicate the maximal deviation from this ideal transmission frequency progression, a maximal relative linear error is defined as $$\Theta := \max_{t \in [0, T_r]} \left.\frac{|f(t) - f_{ideal}(t)|}{f_{ideal}(t)}\right|_{f_0=0} = \frac{1}{m_1}\max_{t \in [0, T_r]}\left|\sum_{l=2}^{N} m_l t^{l-1}\right|$$

with $f_{id}(t) = f_0 + m_1 t$ for the ideal case. The symbol $\theta$ therefore describes a maximum deviation of the momentary frequency progression for $f_0=0$ from the linear function $f_{id}(t)|_{f_0=0}$. Taking into consideration the noise term r(t) that is always present in real applications, the following is obtained from Equation 3, with $q(t)=q_e(t)+r(t)$ $$q(t) = \exp\left\{-j\frac{4\pi R}{c}\left(f_0 + \sum_{l=1}^{N} m_l t^l\right)\right\} + r(t) \quad (4)$$

If the complex-value noise signal r(t) is assumed to be white and gaussian distributed in Equation 4, for the sake of simplicity, the noise influence for a significantly large signal-to-noise ratio can also be considered as phase noise $e^{j\bar{r}(t)}$, whereby $\bar{r}(t)$ is real-valued, white, and gaussian distributed. The phase signal, which is made time-discrete with the scanning cycle $T_A$, results from $$\arg\{q(nT_A)\} = \phi(nT_A) = -\frac{4\pi R}{c}\left(f_0 + \sum_{l=1}^{N} m_l (nT_A)^l\right) + \bar{r}(nT_A) \quad (5)$$

Proceeding from the known (received) phase scanning values $\phi(nT_A)$, the method according to the invention implements a robust estimate of the polynomial parameters $m_l$, with $l=2, \ldots, N$. In an advantageous embodiment of the invention, a robust estimate of the unknown object distance R is additionally possible.

Figure 3:
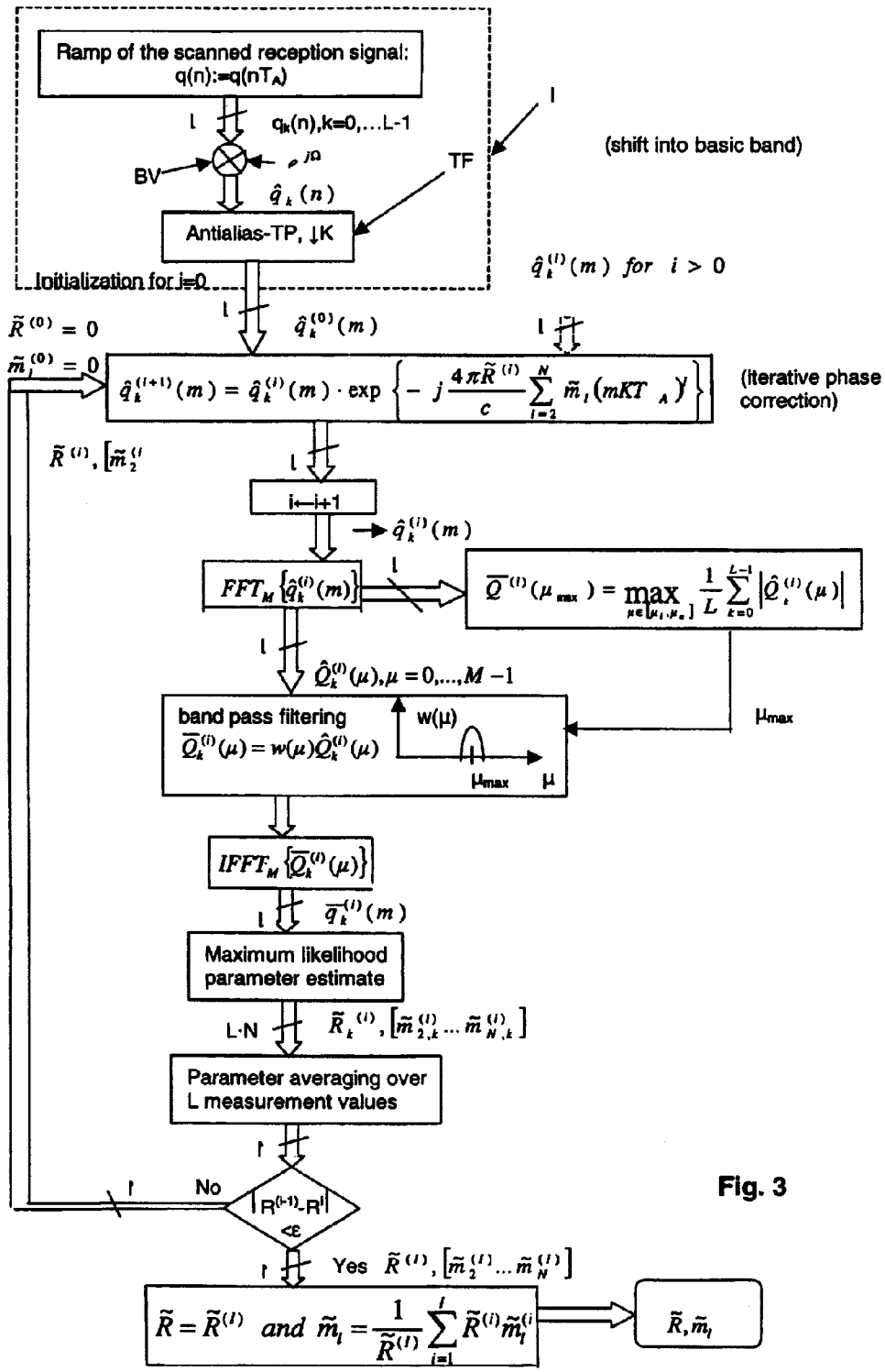
FIG. 3 is a schematic diagram of the method that relates to the invention.
Figure 4:
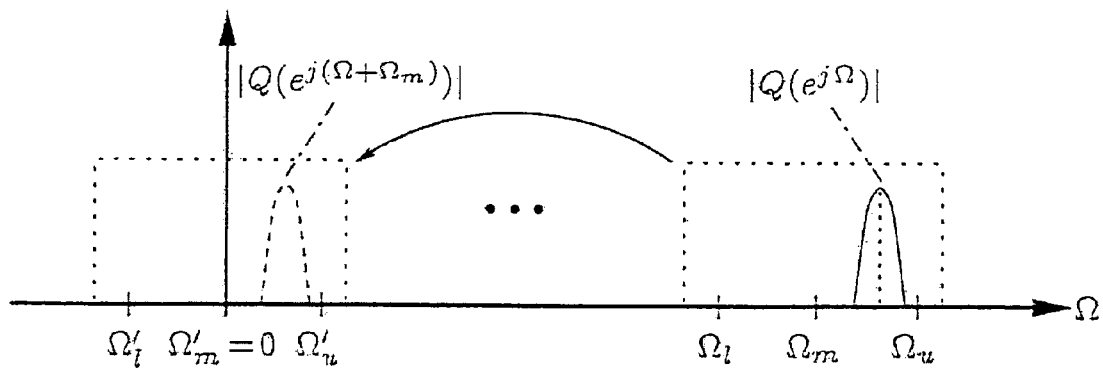
FIG. 4 is a representation of the base band shift of a selected spectrum range in the reception signal.

FIG. 3 shows a block schematic in the form of a sequence schematic of the method according to the invention. The initialization 1 takes place, according to the invention, by means of a base band shift BV of L consecutive ramps of the sequence $q(n)=q(nT_A)$ that results from Equation (4), by means of time discretitation. The shift of a spectrum range, which can be predetermined, of $Q(e^{j\Omega})=F\{q(n)\}$ into the base band is shown as an example in FIG. 4. The cut-off frequencies $\Omega_l$ and $\Omega_u$ are defined, for example, by way of the minimum and maximum distances $R_{min}$ and $R_{max}$, which are determined by the purpose of use of the FMCW radar system:

$$\Omega_l = \frac{4\pi}{c}R_{min}m_1 T_A, \; \Omega_u = \frac{4\pi}{c}R_{max}m_1 T_A, \; \Omega_m = \frac{1}{2}(\Omega_u - \Omega_l)$$

The ramp signals $q_k(n)$ that are formed in this manner possess a band-pass spectrum. It is advantageous that after the base band shift and the subsequent antialiasing low-pass filtering TF, the scanning cycle can be reduced by a factor K. In this connection, the factor K particularly lies between K=30 and K=60. This results in advantages with regard to a reduction in effort/expense of all further partial operations.

The next step or progression of the block diagram in FIG. 3 shows the sequence of the iterations for the calculation of a correction phase term for partial compensation of non-linear frequency components in the basic band reception sequences $\hat{q}_k^{(i)}(m)$ with m as a time index after cycle reduction. In the further process steps, a signal sequence whose scanning cycle $T_A$ was reduced is assumed with $\hat{q}_k^{(i)}(m)$. Of course, these process steps can also be carried out with a sequence $\hat{q}_k^{(i)}(n)$, whose scanning cycle $T_A$ was not reduced.

Within the loop that runs through in each iteration, it is advantageous if band-pass filtering of the sequences $\hat{q}_k^{(i)}(m)$ is located at the beginning, which is advantageously carried out as windowing in the spectrum range, whereby all the spectral coefficients outside the window are set to zero. It is advantageous if a Hamming window is used as the window function.

In the case of several reflecting objects, the reception signal spectrum of a single object is selected by means of the band-pass filtering. All of the other, undesired spectra are suppressed. In addition, suppression of those noise-like spectrum components that do not belong to the working component takes place. In this way, the SNR can be increased after the band-pass filtering, even in the case of a single reflecting object.

To calculate the band-pass filtering, it is advantageous to perform a Fast Fourier Transformation FFT of the sequences $\hat{q}_k^{(i)}(m)$. For this purpose, it is advantageous if the individual discrete Fourier transforms $\hat{Q}_k^{(i)}(\mu)$ of the base band reception sequences $\hat{q}_k^{(i)}(m)$ are calculated, whereby $\hat{Q}_k^{(i)}(\mu)=FFT\{\hat{q}_k^{(i)}(m)\}$ for k=1, ..., L. The number of FFT points M typically lies at up to 1000. In the case of a reduction of the scanning cycle $T_A$ that has advantageously been performed, and prior antialiasing low-pass filtering, the FFT can be carried out with a smaller number of points M of 64 to 256.

In a next iteration step, filtered base band reception sequences $\overline{q}_k^{(i)}(m)$ are calculated by means of a band-pass filter according to $\overline{Q}_k^{(i)}(\mu)=w(\mu)\hat{Q}_k^{(i)}(\mu)$, with $\overline{Q}_k^{(i)}(\mu)=FFT\{\overline{q}_k^{(i)}(m)\}$, whereby $w(\mu)$ is a spectrum window that can be predetermined, and $\mu \in [\mu_u,\mu_1]$ indicates the range of the spectrum window having a window center point $\mu_{max}$ that can be predetermined, whereby, with a lower limit $\mu_u$ that can be predetermined, and an upper limit $\mu_1$ that can be predetermined. In order to determine the position of the center point $\mu_{max}$, the FFT magnitude spectra $|\hat{Q}_k^{(i)}(\mu)|$ are averaged over the number L, and the maximum is sought from the averaged spectrum, according to the following formula:

$$\overline{Q}^{(i)}(\mu_{max}) = \max_{\mu \in [\mu_l,\mu_u]} \frac{1}{L}\sum_{k=0}^{L-1} |\hat{Q}_k^{(i)}(\mu)|$$

For example, for a single reflecting object, $\mu_1=0$ and $\mu_u=M-1$. For several non-overlapping objects, the limits $\mu_1$ and $\mu_u$ must be selected so that in each instance, only the spectral component that corresponds to the object of interest is detected.

Subsequently, it is advantageous if the calculation of the individual inverse discrete Fourier transformed $\overline{q}_k^{(i)}(m)$ of the filtered FFT spectra $\overline{Q}_k^{(i)}(\mu)$ takes place, whereby $\overline{q}_k^{(i)}(m)=IFFT\{\overline{Q}_k^{(i)}(\mu)\}$ for k=1, ..., L.

In a subsequent iteration step, the distances $\tilde{R}_k^{(i)}$ are estimated by means of a maximum likelihood estimating method. The estimated distances $\tilde{R}_k^{(i)}$ can be estimated from the polynomial coefficients $\tilde{m}_{l,k}^{(i)}$. Subsequently, the distances $\tilde{R}_k^{(i)}$ are averaged over L reception sequences $\hat{q}_k^{(i)}(n)$. In a final iteration step, a reception sequence $\hat{q}_k^{(i=I)}(m)$ with the averaged estimated polynomial coefficients $\tilde{m}_l$ is calculated as the starting point for a next iteration loop, according to $$\hat{q}_k^{(i+1)}(m) = \hat{q}_k^{(i)}(m) \cdot \exp\left\{j\frac{4\pi\tilde{R}_k^{(i)}}{c}\sum_{l=2}^{N}\tilde{m}_l(mKT_A)^l\right\}$$

The maximum likelihood parameter estimate takes place by using the linear estimator $$\tilde{v}=[A^TA]^{-1}A^Tb \tag{6}$$

with the vectors $\tilde{v}=[\tilde{R}f_0,\tilde{R}m_1,\tilde{R}m_2, \ldots]^T$, $b=[\Phi(0),\Phi(T_A), \Phi(2T_A), \ldots]^T$ and a matrix A having the dimension $L_q \times (N+1)$, whereby $L_q$ represents the length of a sequence $\hat{q}_k^{(i)}(m)$. The determination of the phase values $\phi(nT_A)$ in the vector b takes place by means of a phase unwrapping method.

A reduced linearity error in the downsampled base band signal sequence $\hat{q}_k^{(i)}(m)$ is successively achieved by means of the phase correction, and this results in a lesser estimate variance, in each instance. If the condition $|\tilde{R}^{(i-1)}-\tilde{R}^{(i)}|<\epsilon$ has been fulfilled after i=I iterations, final estimated values $\tilde{R}$ and $\tilde{m}_l$ can be calculated from the individual intermediate results $\tilde{R}^{(i)}$ and $\tilde{m}_l^{(i)}$, which have been averaged over all L reception sequences in the $i^{th}$ iteration, in each instance, according to:

$$\tilde{R} = \tilde{R}^{(I)} \text{ and } \tilde{m}_l = \frac{1}{\tilde{R}^{(I)}}\sum_{i=1}^{I}\tilde{R}^{(i)}\tilde{m}_l^{(i)}, l = 2, \ldots N$$

In the following, it will be shown that it is possible, using the method according to the invention, to reconstruct the spectral resolution, which has been reduced as a result of the linearity error in the FMCW radar transmission signal, of the sampled, mixed reception signal q(n). This will be shown in exemplary manner below, using the example of two objects at different distances.

The starting point is a quadratic transmission signal sequence (chirp) with a linearity error of $\theta=5\%$, whereby the simulation parameters are selected to be N=2, $m_2=5\times10^{12}$, SNR=−18 dB, K=40, and M=64. For the other system parameters, the following table applies:

| Parameter | Value |
| --- | --- |
| Minimum possible distance | $R_{min}$ = 900 m |
| Maximum possible distance | $R_{max}$ = 1,100 m |
| Ramp increase time | $T_r$ = 1 ms |
| Radio Fundamental frequency | $f_0$ = 35 GHz |
| Frequency deviation | B = 100 MHz |
| Sampling frequency | $f_A$ = 2 MHz |
| Spectrum averaging L | L = 20 |
| Spectrum averaging, total | 25 × L = 500 |
| Spectrum window w (μ) | Hamming window |

Figure 5:
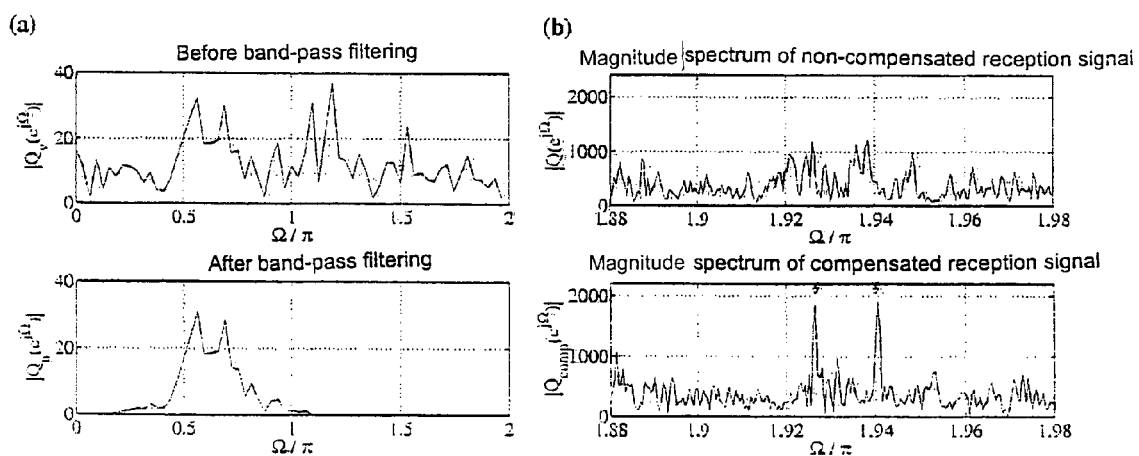
FIG. 5a is a representation of a spectrum of a down-sampled basic band signal before and after the band pass filtering.
FIG. 5b is a representation of a magnitude spectrum of a radar reception signal before and after the phase correction.

The objects are located at the distances $R_0$=900 m and $R_1$=1,100 m. FIG. 5 shows the magnitude spectra $|Q_v(e^{j\Omega})|$ $|,|Q_n(e^{j\Omega})|$ of the downsampled signal $\hat{q}_k^{(0)}(m)$ for a fixed $k=0, \ldots, L-1$ during the first iteration before (top representation in FIG. 5a) and after (bottom representation in FIG. 5b) band-pass filtering. The partial spectra, which can be easily separated, are clearly evident, whereby the bottom partial spectrum, which belongs to the object at the distance $R_1$, is selected in the band-pass filtering.

The top figure in FIG. 5b shows the range of the magnitude spectrum $|Q(e^{j\Omega})|$ of the radar reception signal that is of interest, which is established by the minimum and maximum distance (see table). As the result of the non-linearity in the transmission signal, the frequency lines that correspond to the two objects are smeared and can hardly be recognized. Using the parameters estimated for the object at the distance $R_1$, using the method according to the invention, the inherently non-linear component of this signal is now compensated, as shown in the bottom part of FIG. 5b.

A comparison of the figures shows the clear increase in the object resolution. The small triangles in the bottom part of FIG. 5b characterize the positions of the frequency lines in the magnitude spectrum $|Q(e^{j\Omega})|$, which would generate a transmission signal having a linear frequency increase.

Accordingly, while at least one embodiment of the present invention have been shown and described, it is to be understood that many changes and modifications may be made thereunto without departing from the spirit and scope of the invention as defined in the appended claims.

What is claimed is:

1. A method for the linearization of frequency-modulated continuous wave (FMCW) radar devices having a non-linear, ramp shaped, modulated transmitter frequency progression x(t) comprising the steps of:
    correcting a phase term on a receiver side of a FMCW radar device said correction for compensating a phase error in a reception signal q(t) which further comprises the following steps:
    selecting a number (L) of consecutive ramp-shaped reception sequences $q_k(n)$ of the reception signal, wherein said number is predetermined with $k=1, \ldots, L$;
    representing a set of phases $\arg\{q_k(n)\}$ which are represented as a polynomial of an $N^{th}$ order for a time index n, with a polynomial coefficient $m_l$, with $l=1, \ldots, N$, ;
    transforming a spectrum range $Q(e^{j\Omega})$ of the selected reception sequences q(n) into a predetermined base band, wherein a set of base band reception sequences $\hat{q}_k(n)$ with $k=0, \ldots, L-1$ are generated in each instance;
    iteratively calculating a correction phase term for partial compensation of non-linear frequency components in said base band of reception sequences $\hat{q}_k(n)$ by calculating a set of polynomial coefficients $\tilde{m}_{l,k}^{(i)}$ of the individual base band reception sequences $\hat{q}_k(n)$ via estimation methods, wherein $\hat{q}_k(n)$ are the sequences that have already been iteratively phase corrected, wherein said iteration is stopped once a parameter change between two consecutive iterations, which are predetermined, remains below a threshold $\epsilon$ which is predetermined.

2. The method as in claim 1, wherein said step of calculating polynomial coefficients, includes using said coefficients $\tilde{m}_{l,k}^{(i)}$ which includes estimating a distance $\tilde{R}_k^{(i)}$ between a radar device emitting a transmission signal x(t) and an object reflecting a transmission signal x(t).

3. The method as in claim 1, wherein said step of iteratively calculating a correlation phase term comprises the steps of:
    calculating an individual discrete Fourier transformation $\hat{Q}_k^{(i)}(\mu)$ of the base band reception sequences $\hat{q}_k^{(i)}(n)$ whereby $\hat{Q}_k^{(i)}(u)=FFT\{\hat{q}_k^{(i)}(n)\}$ for $k=1, \ldots, L$
    calculating filtered base band reception sequences $\overline{q}_k^i(\mu)$ by means of a band pass filter according to $\overline{Q}_k^{(i)}(\mu)=w(\mu)\hat{Q}_k^{(i)}(\mu)$ wherein w ($\mu$) is a spectrum window that is predetermined and indicates a range of a spectrum window having a $\mu_{max}$ that is predetermined wherein $\mu \in [\mu_u, \mu_l]$ with a low limit $\mu_u$ that is predetermined and an upper limit $\mu_l$ that is predetermined;
    calculating an individual inverse Fourier transformation $\overline{q}_k^{(i)}(n)$ of a filtered base band reception sequence $\overline{Q}_k^{(i)}(\mu)$ wherein $\overline{q}_k^{(i)}n=IFFT\{\overline{Q}_k^{(i)}(\mu)\}$ for $k=1, \ldots, L$;
    estimating at least one distance $\tilde{R}_k^{(i)}$ by means of a maximum likelihood estimation method;
    calculating a polynomial coefficient $\tilde{m}_{l,k}^{(i)}$ from the estimated distances $\tilde{R}_k^{(i)}$;
    averaging of said polynomial coefficient $\tilde{m}_{l,k}^{(i)}$ with $l=1, \ldots, N$ over L reception sequences $\hat{q}_k$ with $k=1, \ldots, L$;
    averaging a set of distances $\overline{R}_k^{(i)}$ over L reception sequences $\hat{q}_k(n)$;
    calculating the reception sequences $\hat{q}_k^{(i=1)}(n)$ with the averaged, estimated polynomial coefficients as the starting point for the next iteration.

4. The method as in claim 1, wherein said iteration step is stopped upon reaching a predetermined number of iteration steps.

5. The method as in claim 3, wherein said iteration step is stopped if a condition $|R^{(i-1)}-R^{(i)}|<\epsilon$ is reached with $\epsilon$ being a threshold that is predetermined.

6. The method as in claim 5, further comprising the step of calculating a set of final estimate values $\tilde{R}, \tilde{m}_l$ via the following formula $$\tilde{R} = R^{(i)}; \tilde{m}_l = \frac{1}{\tilde{R}^{(i)}} \sum_{i=1}^{I} \tilde{R}^{(i)} m_l^{(i)}.$$

7. The method as in claim 3, wherein said spectrum window is a rectangular window or a Hamming window.

8. The method as in claim 4, wherein a position of a center point $\mu_{max}$ of a spectrum window corresponds to a maximum amount of FFT $|\hat{Q}_k^{(i)}(\mu)|$ generated by averaging of an amount FFT of a base band reception sequence $|\hat{Q}^{(i)}(\mu_{max})|$ over a number L.

9. The method as in claim 1, wherein said reception signal is mixed with said transmission frequency into a lower frequency position that is predetermined.

10. The method as in claim 3, wherein after said step of base band transformation, the method further comprises the step of reducing a scanning cycle $T_A$ of a ramp signal $q_k(n)$, wherein the ramp signals $q_k(n)$ are filtered by means of an Antialias low-pass.

11. The method as in claim 10, wherein scanning cycle $T_A$, is reduced by a factor K which lies between K=30 and K=60.

12. The method as in claim 4, wherein said number of predetermined iterations, is between 10 and 20 iterations.

* * * * *